(12) United States Patent
Yasukawa et al.

(10) Patent No.: US 8,707,330 B2
(45) Date of Patent: Apr. 22, 2014

(54) METHOD AND SYSTEM FOR CONTROLLED COMMUNICATION BETWEEN APPLICATIONS

(75) Inventors: Kenta Yasukawa, Kawasaki (JP); Andrew Ton, San Jose, CA (US); Bo Xing, Fremont, CA (US); Johan Hjelm, Nakano-ku (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 159 days.

(21) Appl. No.: 13/457,695

(22) Filed: Apr. 27, 2012

(65) Prior Publication Data

US 2013/0290981 A1    Oct. 31, 2013

(51) Int. Cl.
*G06F 13/00*   (2006.01)

(52) U.S. Cl.
USPC ..................................................... 719/313

(58) Field of Classification Search
CPC .................................. G06F 9/54; G06F 9/541
See application file for complete search history.

(56) References Cited

U.S. PATENT DOCUMENTS

| | | | |
|---|---|---|---|
| 6,967,736 B2 * | 11/2005 | Simpson et al. | 358/1.15 |
| 2003/0172288 A1 | 9/2003 | Sasage | |
| 2011/0047544 A1 | 2/2011 | Yehuda et al. | |
| 2011/0072428 A1 | 3/2011 | Day, II et al. | |
| 2011/0162046 A1 | 6/2011 | Forster et al. | |
| 2012/0284806 A1 * | 11/2012 | de Jong | 726/29 |
| 2013/0110961 A1 * | 5/2013 | Jadhav | 709/213 |

FOREIGN PATENT DOCUMENTS

WO    WO 01/97029 A2    12/2011

OTHER PUBLICATIONS

International Search Report, PCT Application No. PCT/SE2012/050573, Aug. 26, 2013.
Written Opinion of the International Searching Authority, PCT Application No. PCT/SE2012/050573, Aug. 26, 2013.

* cited by examiner

*Primary Examiner* — Andy Ho
(74) *Attorney, Agent, or Firm* — Myers Bigel Sibley & Sajovec, P.A.

(57) ABSTRACT

A method, system and computer program in a software framework for enabling controlled communication between a generic application on the software framework and a service application in a second environment. An access request is transmitted by the generic application to an interface provision unit. The request includes an identity of the generic application. An instant interface is provided by the interface provision unit to the second environment. The instant interface is determined by the access request and dedicated for the generic application. A response is returned by the interface provision unit to the generic application including an address to the instant interface. Thereby the instant interface permits controlled communication between the generic application and the service application, thus enabling the new controlled communication without changes of the second environment.

24 Claims, 5 Drawing Sheets

METHOD AND SYSTEM FOR CONTROLLED COMMUNICATION BETWEEN APPLICATIONS

TECHNICAL FIELD

The present disclosure relates generally to a method, system and computer program product in a software framework for enabling controlled communication between a generic application on a software framework and a service application in a second environment.

BACKGROUND

There are a number of software frameworks available in which various applications can be run. A typical configuration may be a hardware platform with a software framework operating on top of the hardware. Further, it is typical to have applications that runs on top of the software framework, or services that runs as a part of the software framework. Software framework may also be referred to as software platform, software environment, software execution environment, application framework, or operating system. There are a number of proprietary software frameworks supporting this concept, and also an increasing number of open or standardized software frameworks. Further, it becomes more common to have another software framework that runs on top of the first software framework. It is possible to have a plurality of software frameworks on top of each other, or running alongside the first software framework.

There are a number of advantages with software frameworks combined in layers or running alongside. A certain software framework may be suitable for a specific hardware platform, or adapted for a specific processor/central processing unit. Another software framework may be preferable for a certain kind of services or user applications. Another software framework may be preferable because of simplicity or robustness to program applications for it.

For extraction of benefits of the applications operating on a software framework, the applications may need to communicate with other applications, other units connected to the hardware platform, or other nodes accessible via a network. An example is an application for control of a multimedia playing device. The control application need to be able to communicate with the multimedia playing device in order to control it, and the multimedia playing device may be retrieving the content from a storage application. Another example is a home automation application for control of climate and surveillance. Such an application may need to be capable to read a number of different sensors, influence various actuators, and potentially transmit alarm messages at, e.g. an intrusion in a home or a broken heating system in the middle of the winter.

A continuation of the above example is where it is desired that the multimedia solution and the home automation/surveillance solution coexist on a common hardware platform and software framework. Further the multimedia solution and the home automation/surveillance solution may partially share some of the resources.

A problem today is to control which application that should be able to communicate with other applications. Another problem is how one application should be able to communicate with another application, i.e. what permissions and restrictions should be applied to a communication. Another problem is where two software frameworks may be operated on the same physical unit with one software framework in the bottom and one software framework operating in the other one, with applications running on each software framework. Another problem today is how to remotely manage control of the communication between two applications, the two applications not running on the same software framework. Another problem today is how to make changes in a running system without restarting the system, changes which may influence the control of or settings for the communication between two applications, the two applications not running on the same software framework.

SUMMARY

It is an object of various embodiments of the invention to address how to handle security with an application on a software framework connecting to another application on another software framework than the former one, and what permissions and restrictions that should be applied to such communication with leveraging the existing mechanisms in the latter software framework. It is possible to achieve these objects and others by using a method, system and computer program as defined in the attached independent claims.

According to one aspect, a method is provided in a software framework for enabling controlled communication between a generic application on the software framework and a service application in a second environment. The method comprises transmission of an access request by the generic application to an interface provision unit, where the request includes an identity of the generic application. The method further comprises provision of an instant interface by the interface provision unit to the second environment, where the instant interface is determined by the access request and dedicated for the generic application. The method further comprises return of a response by the interface provision unit to the generic application including an address to the instant interface, wherein the instant interface permits controlled communication between the generic application and the service application, thus enabling the new controlled communication without changes of the second environment.

An advantage with an instant interface permitting communication between a generic application and a service application, is that security may be maintained within a software framework. I.e. in order to enable communication between two applications, where a second one is located on a second environment, security mechanisms does not have to be compromised.

According to another aspect, an system is provided in a software framework for enabling controlled communication between a generic application on the software framework and a service application in a second environment. The system comprises the generic application adapted to transmit an access request to an interface provision unit, where the request includes an identity of the generic application. The provision unit is adapted to provide an instant interface to the second environment with the instant interface determined by the access request and dedicated for the generic application. The interface provision unit is adapted to return a response to the generic application including an address to the instant interface, wherein the instant interface permits controlled communication between the generic application and the service application, thus enabling the new controlled communication without changes of the second environment.

According to another aspect, a computer program, comprising computer readable code means is provided. The computer program comprises computer readable code means which when run by a system in a software framework for enabling controlled communication between a generic application on the software framework and a service application in a second environment, causes the system to perform transmission of an access request by the generic application to an interface provision unit, where the request includes an identity of the generic application. The computer program further comprises provisioning of an instant interface by the interface provision unit to the second environment, where the instant interface is determined by the access request and dedicated for the generic application. The computer program further comprises return of a response by the interface provision unit to the generic application including an address to the instant interface, wherein the instant interface permits controlled communication between the generic application and the service application, thus enabling the new controlled communication without changes of the second environment.

The above method, apparatus, and computer program may be configured and implemented according to different optional embodiments. In one possible embodiment an interface manager in the interface provision unit receives the request from the generic application, wherein the interface manager requests an interface creator to create the instant interface with an address. In an embodiment the interface creator creates the instant interface and replies the address, for the created instant interface, to the interface manager. In an embodiment the interface manager transmits an instruction to the second environment, to acquire and install the instant interface, identifying the instant interface with the address. In an embodiment the second environment acquires and installs the instant interface. In an embodiment the second environment confirms the completed installation to the interface manager. In an embodiment the interface manager transmits a signal to the second environment, the signal containing an instruction to start operation of the just installed instant interface, wherein the second environment starts the instant interface. In an embodiment the interface manager receives a response which includes a confirmation of the successful start of, and the address to, the instant interface.

An advantage with the solution is that a plurality of generic applications communication with a plurality of service applications residing in a second environment, each generic application via its own instant interface, security mechanisms may be applied individually for each generic application. Thereby it is possible to maintain a fine granularity of security mechanisms. Another advantage with providing instant interfaces which controls and regulates the communication between a generic application and at least one service application, is that the security mechanism available in the second environment can be applied to the communication without requiring changes to either the first or second software framework.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable a controlled communication between a generic application and a service application, where the applications are operating in different environments, but in the same software framework. The herein suggested technology provides a solution to control the communication between the two applications, by providing permission to the only necessary communication between the two applications. Examples of generic applications are multimedia/home entertainment applications, home automation applications, surveillance applications, and similar applications. An illustrative example of a service application is an application for a specific type of device, the device originating from a specific vendor. Examples of service applications are those which function with accessing: set-top boxes, multimedia playing devices, temperature sensors, cameras, motion sensors, radars, other types of surveillance equipment, sports and training equipment; healthcare monitoring devices; elderly people emergency devices, not limiting the description to other related devices or other types of devices.

The generic application for operating on a software framework is arranged to send an access request to an interface provision unit. The interface provision unit provides an instant interface to a second environment, in which a service application also operates. When the instant interface is operational, the instant interface will permit the generic application to communicate with a specific service application, or a group of service applications in a predetermined way. Thereby it is not possible for a generic application to communicate with, or at all have access to, other service applications in other ways than what is defined by the instant interface. When a need for an instant interface has disappeared, the instant interface may be removed.

Figure 1:
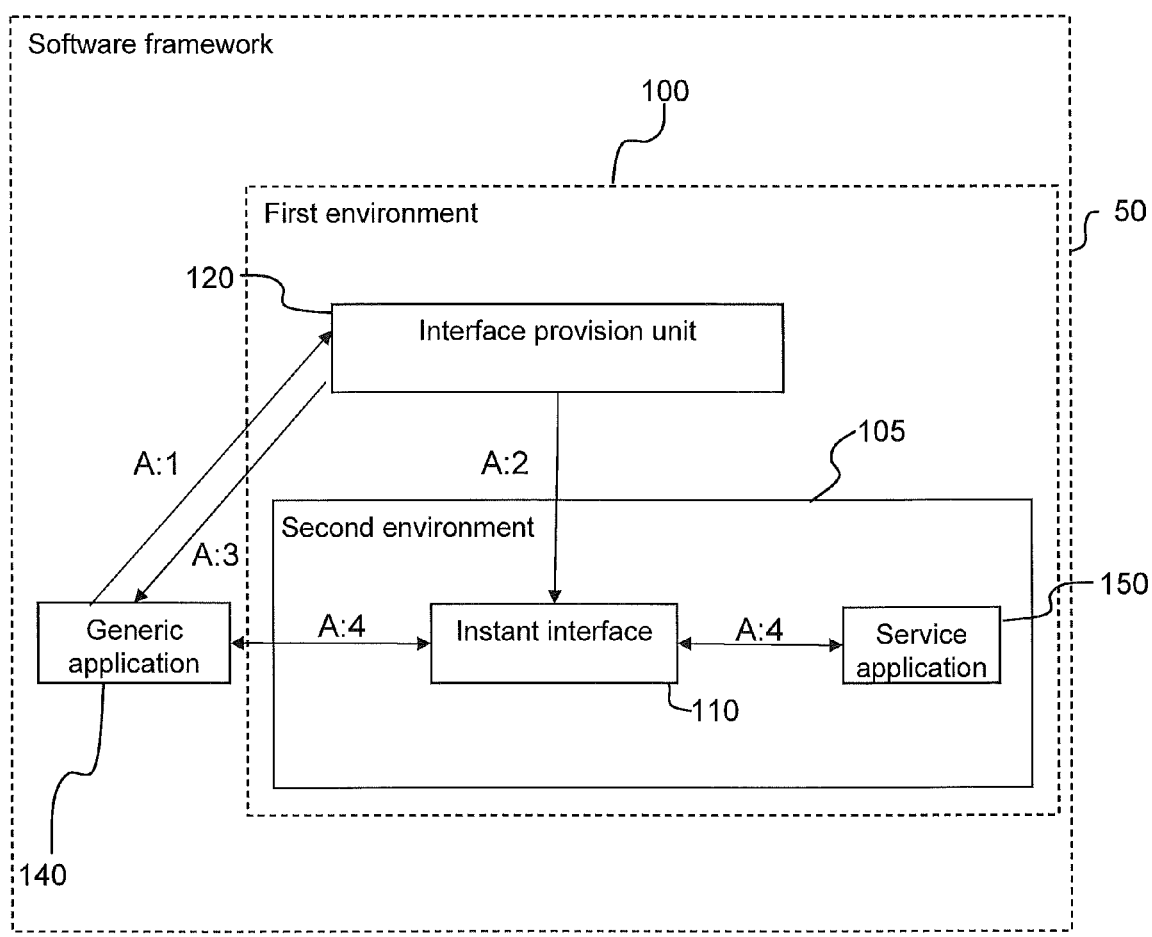
FIG. 1 is a communication scenario illustrating an example of the system.

FIG. 1 shows an example of a software framework 50 with an instant interface 110, interface provision unit 120, generic application 140 and a service application 150.

The generic application 140 is arranged to operate on the software framework 50. Non-limiting examples of software frameworks may be Android, Linux, Unix type software frameworks, Python, Windows. When a generic application 140 needs access to the service application 150, the generic application 140 transmits an access request A:1 to the interface provision unit 120. The request A:1 by the generic application 140 includes an identity of the generic application 140. Examples of such identities are: name, package name, application identity, application key, application digital signature. Other identities may as well be used, such that a generic application 140 can be identified by the interface provision unit 120. The interface provision unit 120 may verify the generic application 140, based on the identity of the generic application 140. For example, the interface provision unit 120 may be operated in a first environment 100. The first environment 100 may be a software application, an operating system, or another software framework, an android application, a java virtual machine, etc. This is not limiting the first environment 100 to be other types of building blocks used in software systems. The interface provision unit 120 is arranged to provide A:2 the instant interface 110 to a second environment 105.

The characteristics of the instant interface 110 to be provisioned, is determined based on the access request, which included the identity of the generic application 140. Thereby, the instant interface 110 is dedicated for the generic application 140. When the interface provision unit 120 has provided the instant interface 110, it is arranged to return a response A.3 to the generic application 140. The instant interface may be generated by injecting a software module whose format, packaging and name may be different depending on the second environment. The module may be called bundle, software bundle, module, software module, pseudo software module, software, software code, program code, etc. An instant interface may be composed of a configuration file, and/or, programming library, binary code, script code, or other building elements normally used in software programming and its content may depend on what is required to compose a software module in the second environment. The interface provision unit is responsible for creating a software module which the second environment can accept in the same way as any other modules in the second environment.

When the generic application 140 has received the response A:3 from the interface provision unit 120, the generic application 140 is permitted to communicate with the service application 150, via the instant interface 110. The instant interface 110 controls and regulates the communication such that the generic application 140 is enabled to obtain and provide all data it is permitted to in relation with the service application 150. In an embodiment, control and regulation for permission granting and access regulation may be applied to the instant interface 110 by the same way, as the permission granting and access regulation mechanism is utilized or applied for any other software modules in the second environment 105. This is enabled because the interface provision unit 120 generates a software module for the second environment 105 which is as same as any other software modules in the second environment 105. Thereby, the generic application 140 is prevented from performing other types of communications, i.e. other than specified in the instant interface 110. The generic application 140 is not permitted to communicate with other service applications 150 outside what is permitted by the instant interface 110. An instant interface 110 may be added or removed dynamically, without the need for a restart of the second environment 105, or any other underlying environment or software framework. Thereby, it is possible to change a system configuration or components on the system, without interrupting other services operating on the system.

The software framework 50 may be implemented in a gateway unit (not shown in figures). Examples of a gateway unit 205 is: ADSL router, wireless LAN access device, fiber-to-the-home termination device, access points for wireless devices, mobile terminal, vehicle arranged terminal, home automation access units, TV set top boxes, pluggable PC's (miniaturized network connected PC), and similar network access points, not limiting to other units.

Figure 2:
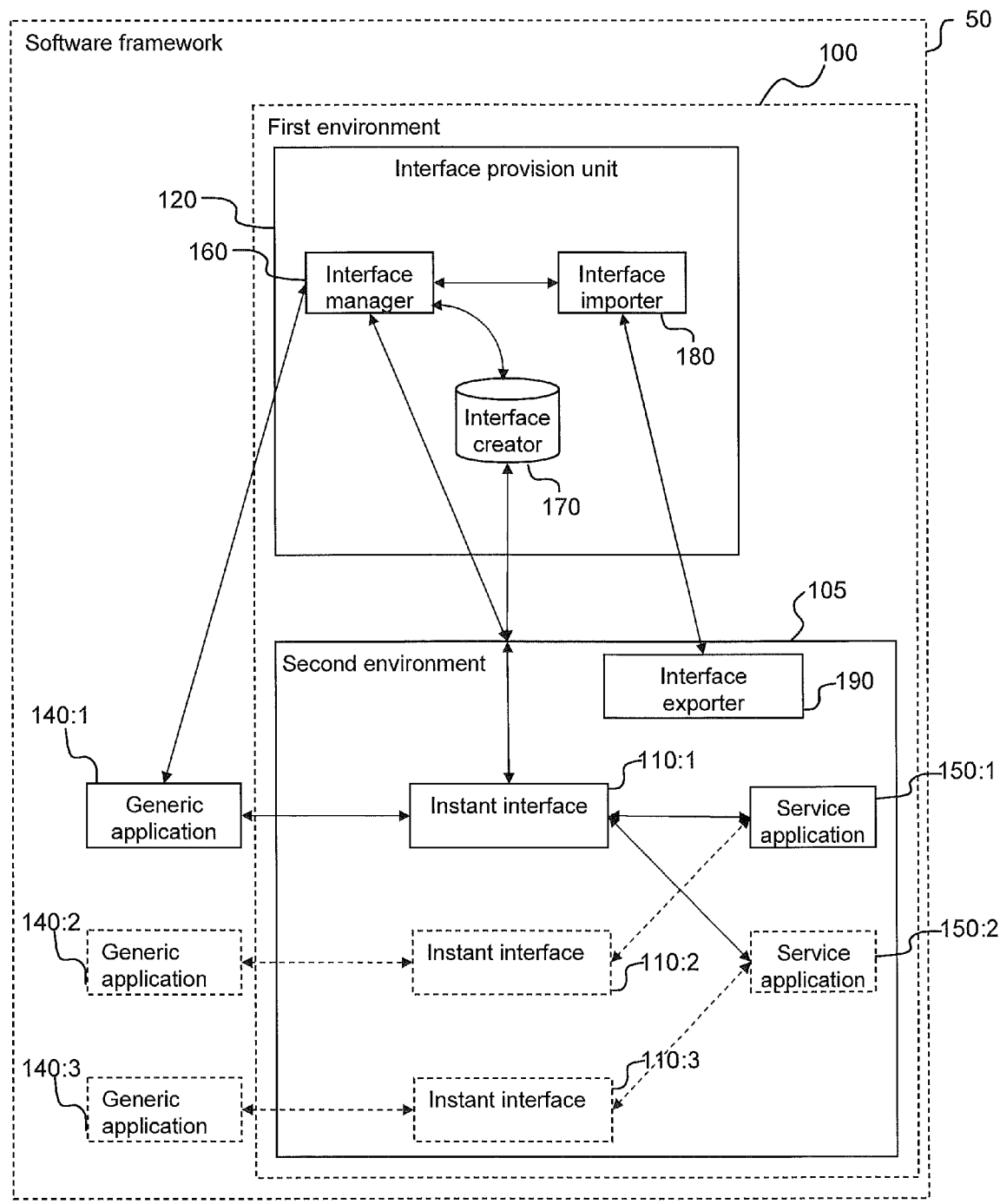
FIG. 2 is a block diagram illustrating some possible embodiments.

Now continuing to FIG. 2, which illustrates embodiments of a solution for controlled communication between generic applications 140 and service applications 150, which includes an interface manager 160 and interface creator 170, arranged within the interface provision unit 120. According to an embodiment a plurality of generic applications 140 may be installed on a software framework 50. Further, a plurality of service applications 150 may be hosted by the second environment 105.

In an embodiment, the generic application 140 may transmit the access request to the interface provision unit 120, wherein the access request is received by the interface manager 160 within the interface provision unit 120. The interface manager 160 may determine if an instant interface 110 already exists for the particular requesting generic application 140. Otherwise the interface manager 160 may consult an authentication and authorization manager, to verify if the generic application 140 is authenticated and authorized to access the second environment 105 comprising the service applications 150. The authentication and authorization manager may be located inside the interface manager 160, or at some other place suitable for an authentication and authorization manager.

If the generic application 140 is authorized, the interface manager 160 may request the interface creator 170 to create an instant interface 110 for the particular generic application 140:*n*. As a final part of the creation process, the interface creator 170 may issue an address for the instant interface 110. Examples of an address may be a file name, a URL (Uniform Resource Locator), a URI (Uniform resource identifier), an e-mail address, or any other address type suitable to identify an instant interface 110. The URL may for example contain the identity of the generic application 140.

The usage of the authentication and authorization manager may provide a limitation of damage caused by denial of service attacks, besides verifying generic applications 140. If the authentication and authorization manager prevents requests from being executed by the interface manager 160, allocation of system resources in the interface provision unit 120, or allocation of other resources in the software framework 50 may thus be limited. Thereby the system may be less vulnerable for denial of service types of attacks. The authentication and authorization manager may, as a non-limiting example, maintain an access control list. The list may be a white list, or a black list, indicating which generic applications 146 that are allowed or that should be denied.

Another example of how to verify that a generic application 140 is authentic, i.e. verifying that is the application really is the generic application 140 declared in the request, is by checking the generic applications 140 process id. The interface manager 160 may implement logic to fetch the process id or any other identity of the generic application 140 by a way that the generic application cannot fake, e.g. asking the underlying application framework to provide the process id or any other identity of the generic application that is using the interface, or id of the generic application 140 process, and thereby verify that the generic application 140 is authentic.

The interface creator 170 may return the address to the interface manager 160. Whenever the interface manager 160 has an address, already existing or created, the interface manager 160 may then respond back to the generic application 140, where the response may include the address to the instant interface 110.

According to an embodiment, the interface manager 160 transmits an instruction to the second environment 105, including the address to the instant interface 110. The instruction may be received by the second environment 105, which may install the instant interface 110 for operation in the second environment 105. When the installation is completed, the second environment 105 confirms installation completion to the interface manager 160.

The interface manager 160 may start or may need to start a new installed instant interface 110. The start of operation of the instant interface 110 may be carried out by that the interface manager 160 transmits a start signal, or call for a start command, to the second environment 105. The start signal or start command may include the address of the instant interface 110.

Further, the start of the instant interface 110 may trigger a start procedure by activation of an interface exporter 190. The trigger may include an interface object to access the features provided in the second environment which can be used for offering services through the instant interface 110 if the second environment is an OSGi environment. If the second environment 105, for example, is an OSGi environment (Open Services Gateway Initiative), the interface exporter 190 is typically residing in the second environment 105. The interface exporter 190 may identify an interface importer 180, located in the first environment 120. The interface importer 180 may from the interface exporter 190 receive the object, which includes the address as a key. When the interface importer 180 has successfully received the object, including the address, the interface importer 180 may send a confirmation in response to the interface exporter 190. The interface exporter 190 may accordingly receive such a confirmation and further respond to the second environment 105, and the second environment 105 may confirm to the interface manager 160, that the new installed instant interface 110 is started and operable.

The interface manager 160 may retrieve the object from the interface importer 180, by use of the address as the key for obtaining the right object. Finally the object may be responded back to the generic application 140. The interface manager 160 may have life cycle permissions granted, for life cycle management of instant interfaces 110. Life cycle permissions may include permissions to add, start, stop and remove instant interfaces 110. The permission set may also be delegated to the interface exporter 190. The interface manager 160 may be operated as a background process, or may be operated as a separate application.

A plurality of generic applications 140:1, 140:2, 140:3; 140:n may be operable on the platform 50. Each generic application 140 may have its own purpose. For example, one application is intended for multimedia (e.g. home cinema), another application may be intended for utility meter reading (electricity, water, gas, consumption), and another application may be intended for elderly surveillance (e.g. emergency alarm, heart monitor). The different generic applications 140: 1, 140:2, 140:3; 140:n may expect communication with various service applications 150:1, 150:2, 150:n. Each generic application will accordingly be provided an individual instant interface 110:1, 11:2, 110:3, 110:n.

For example, as illustrated by FIG. 2, the generic application 140:1 may need to communicate with the service applications 150:1 and 150:2. The instant interface 110:1 will permit the generic application 140:1 to communicate with the service applications 150:1 and 150:2. The generic application 140:2 may need to communicate only with the service application 150:1, and thus the instant interface 110:2 permits the generic application 140:2 to communicate only with the service application 150:1. The generic application 140:3 may need to communicate with the service application 150:2, and therefore the instant interface 110:3 permits the generic application 140:3 to communicate with the service application 150:2. According to the example above, each individual generic application 140 is provided an individual instant interface 110, and the instant interface 110 permits how to communicate with one or more specific service application 150. For example, two generic applications 140 may not be permitted to communicate in the same way with the same service application 150, but only to communicate according to what is required.

Unnecessary security risks are avoided by blocking unspecified communication or by blocking not predetermined communication. A few examples of risks which may be limited is: Even at a case where a hacker manages to get access into one application, that will not automatically provide access to other features or services on the platform outside normal usage. In a case where a trojan application is installed, its access to other services and resources may be limited. A system may be less vulnerable to denial-of-service attacks, when internal communication between different environments on a platform is controlled.

The described solution with generic applications 140 accessing service applications 150, and a first environment 100 hosting a second environment 105, should be seen as an illustrative example. A practical implementation may well include a plurality of first environments 100, second environments 105, as well as generic applications 140 hosted by intermediated environments on top of the platform. This may create a meshed communication structure, controlled by instant interfaces 110. It may also be possible to operate a plurality of software frameworks 50 on a common platform.

Figure 3:
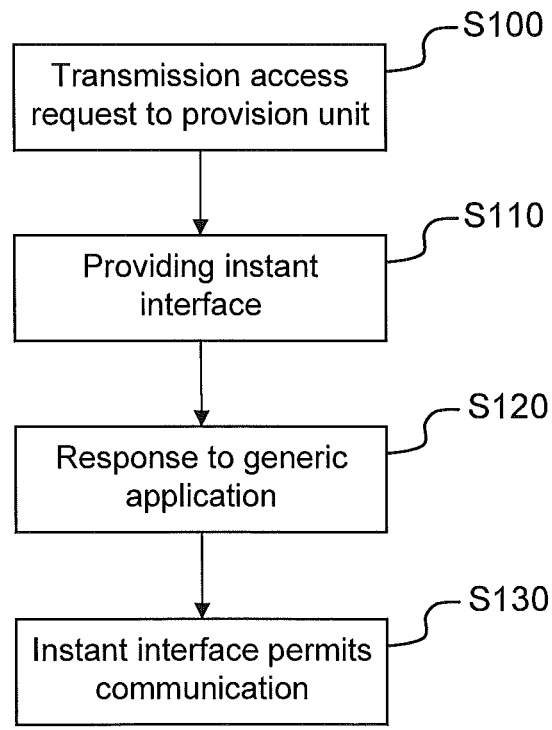
FIG. 3 is a flow chart illustrating a procedure in the system.

A procedure in a software framework 50 for enabling controlled communication between a generic application 140 on the software framework 50 and a service application 150 in a second environment 105, will now be described with reference to FIG. 3. The functional units which are referred to may be found in FIG. 1 and FIG. 2. In a first step S100, an access request is transmitted from the generic application 140, to the interface provision unit 120. The access request relates to enabling of communication with the service application 150. In the next step S110 an instant interface 110 is provided. The instant interface 110 is provided by the interface provision unit 120 to the second environment 105. In the next step S120 the interface provision unit 120 responds back to the generic application 140, confirming the provision of the instant interface 110. In the final step S130 the generic application 140 is enabled to communicate with the service application 150, thus enabled by the instant interface 110, the instant interface 110 permitting the communication.

Figure 4:
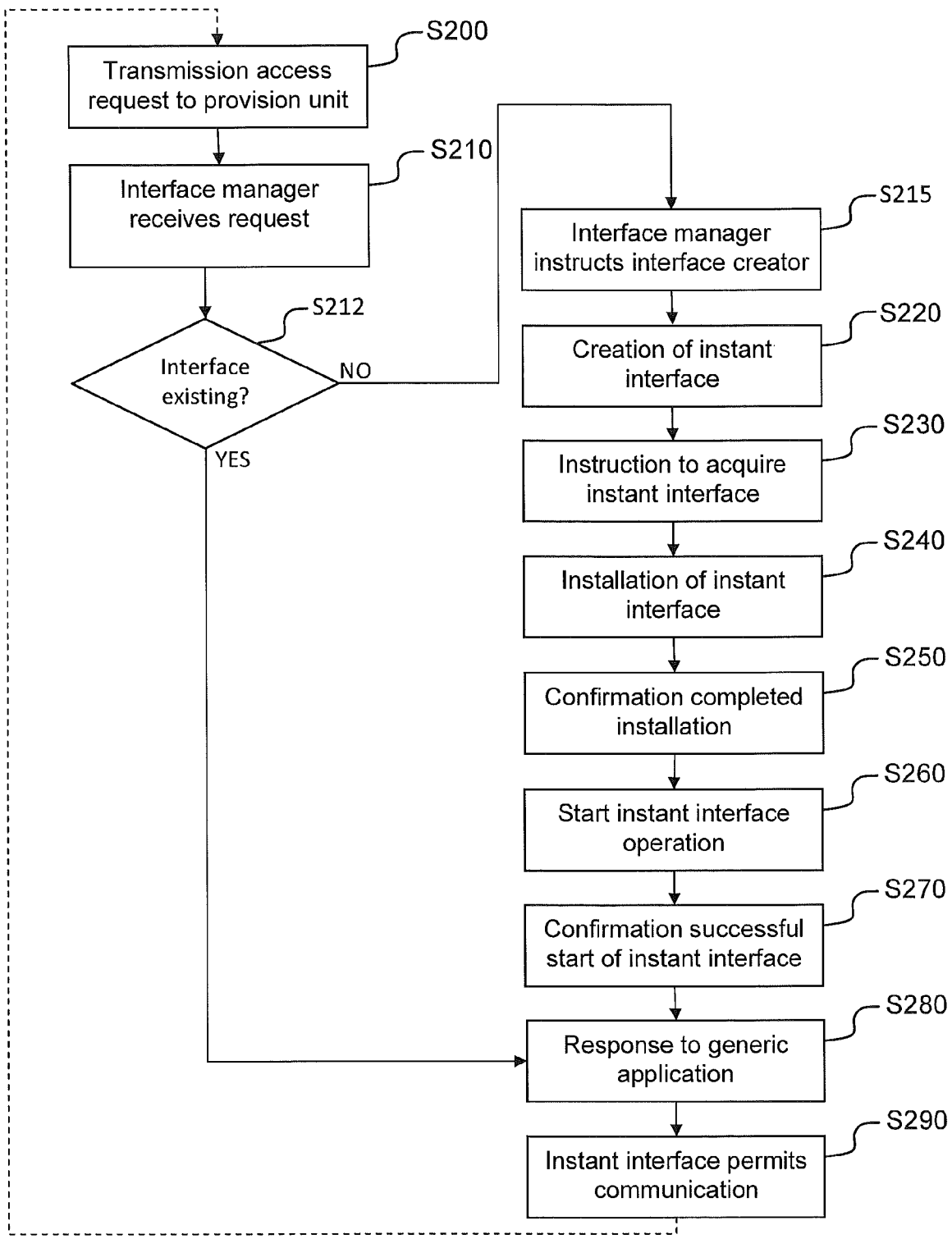
FIG. 4 is a flow chart illustrating a procedure in the system, according to possible embodiments.

Embodiments of procedures in a software framework 50 for enabling controlled communication between a generic application 140 on the software framework 50 and a service application 150 in a second environment 105, will now be described with reference to FIG. 4. The functional units, which are referred to, may be found in FIG. 1 and FIG. 2. In a first step S200 an access request is transmitted by the generic application 140 to the interface provision unit 120. The access request is related to enabling of communication with the service application 150. The access request may be received by the interface manager 160, within the interface provision unit 120. In step S212 it may be determined by the interface manager 160 if an instant interface 110 already exists. If so, the procedure may proceed to step S280.

If no instant interface 110 corresponding to the request by the generic application 140 exists, the procedure continues to step S215. In step S215 the interface manager 160 transmits an instruction to the interface creator 170 to create a new instant interface 110. In step S220 the instant interface 110 may be created. In the next step S230 the interface manager 160 may instruct the second environment 105 to acquire the new created instant interface 110 from the interface creator 170. In step S240 the second environment 105 may install the instant interface 110. In step S250 the completed installation of the instant interface 110 may be confirmed to the interface manager 160.

According to an embodiment, the new installed instant interface 110 needs to be started. In step S260 the instant interface 110 transmits a start signal to the second environment 105, to start the new installed instant interface 110. In step S270 the second environment 105 responds with a confirmation back to the interface manager 160, that the installed instant interface 110 is started and ready to permit communication between the generic application 140 and the service application(s) 150. In the next step S280 the interface manager 160, within the interface provision unit 120, responds back to the generic application 140, confirming the provision of the instant interface 110. In the final step S290 the generic application 140 is enabled to communicate with the service application 150, thus enabled by the instant interface 110 permitting the communication.

Figure 5:
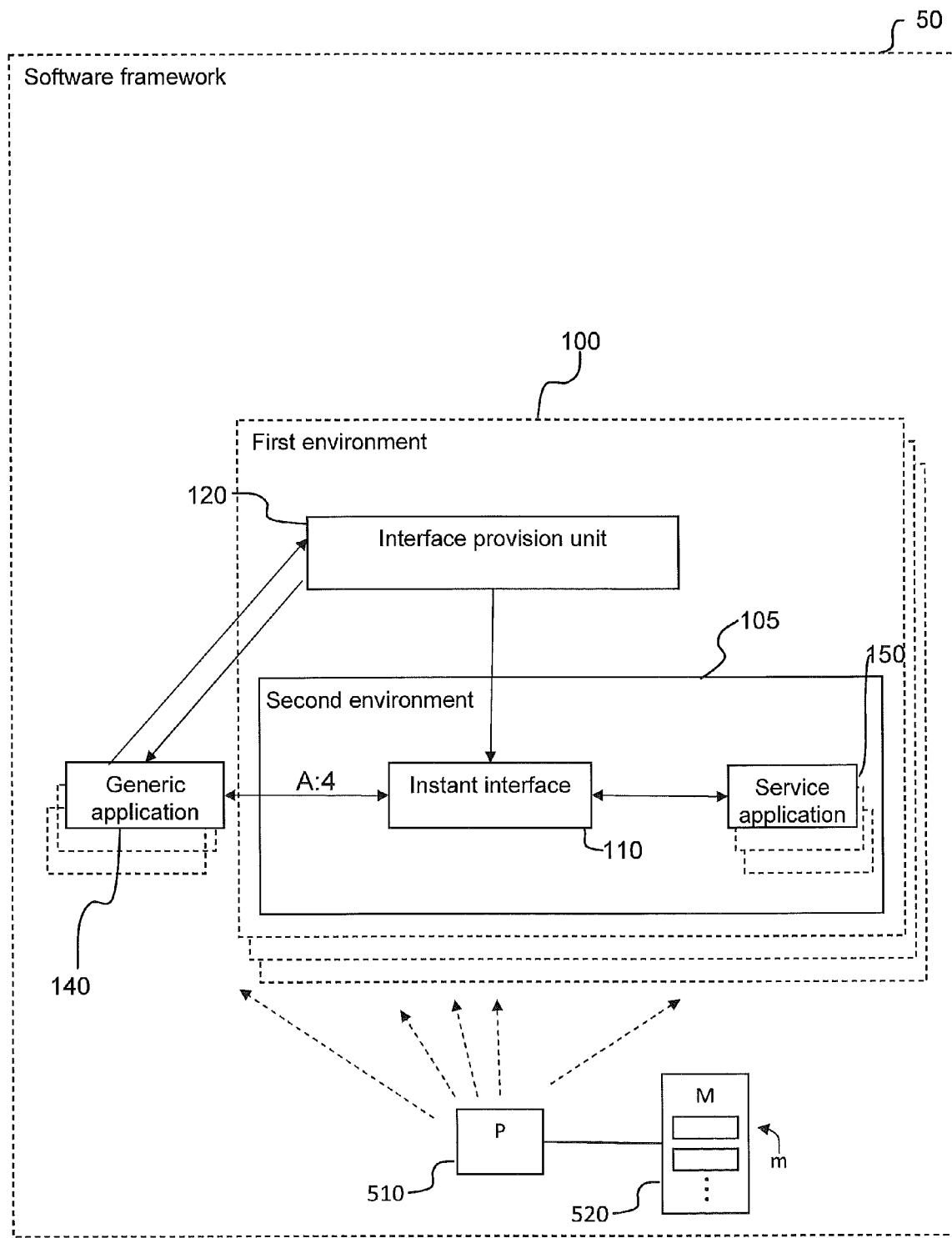
FIG. 5 is a schematic view of controlled communication between a generic application and a service application according to various embodiments.

FIG. 5 shows a schematic view of the solution provided to enable a controlled communication between a generic application and a service application. It should be noted that FIG. 5 illustrates various functional units in the software framework 50 and relations to other systems, applications or devices that may interact with the solution and the skilled person is able to implement these functional units in practice using suitable software and hardware means. Thus, this aspect of the solution is generally not limited to the shown structures of the software framework 50, and the functional units 100, 105, 110, 120, 140, 150, 160, 170, 180 and 190 may be configured to operate according to any of the features described in this disclosure, where appropriate.

The functional units 120, 130, 140, 150 and 210, 220, 230, 240 described above may be implemented in the software framework 50, by means of program modules of a respective computer program comprising code means which, when run by processor "P" 510 causes the software framework 50 to perform the above-described actions. The processor P 510 may comprise a single Central Processing Unit (CPU), or could comprise two or more processing units. For example, the processor P 510 may include general purpose microprocessors, instruction set processors and/or related chips sets and/or special purpose microprocessors such as Application Specific Integrated Circuits (ASICs). The processor P 510 may also comprise a storage for caching purposes.

Each computer program may be carried by a computer program product "M" 520 in the software framework 50, shown in FIG. 2, in the form of a memory having a computer readable medium and being connected to the processor P. Each computer program product M 520 or memory thus comprises a computer readable medium on which the computer program is stored e.g. in the form of computer program modules "m". For example, the memory M 520 may be a flash memory, a Random-Access Memory (RAM), a Read-Only Memory (ROM) or an Electrically Erasable Programmable ROM (EEPROM), and the program modules m could in alternative embodiments be distributed on different computer program products in the form of memories within the software framework 50.

While the solution has been described with reference to specific exemplary embodiments, the description is generally only intended to illustrate the inventive concept and should not be taken as limiting the scope of the solution. For example, the terms "software framework", "environment", "application" and "instant interface" have been used throughout this description, although any other corresponding nodes, functions, and/or parameters could also be used having the features and characteristics described here. The solution is defined by the appended claims.

The invention claimed is:

1. A method performed by at least one processor executing a software framework for enabling controlled communication between a generic application on the software framework and a service application in a second environment, the method comprising:
    transmitting an access request by the generic application to an interface provision unit, the access request including an identity of the generic application;
    providing an instant interface by the interface provision unit to the second environment, the instant interface determined by the access request and dedicated for the generic application; and
    returning a response by the interface provision unit to the generic application including an address to the instant interface,
    wherein the instant interface permits controlled communication between the generic application and the service application, to enable the new controlled communication without changes of the second environment.

2. The method according to claim 1, wherein:
    an interface manager in the interface provision unit receives the access request from the generic application; and
    the interface manager requests an interface creator to create the instant interface with an address.

3. The method according to claim 1, wherein the interface creator creates the instant interface and replies the address, for the created instant interface, to the interface manager.

4. The method according to claim 1, wherein the interface manager transmits an instruction to the second environment, to acquire and install the instant interface, identifying the instant interface with the address.

5. The method according to claim 1, wherein the second environment acquires and installs the instant interface.

6. The method according to claim 1, wherein the second environment confirms the completed installation to the interface manager.

7. The method according to claim 1, wherein:
    the interface manager transmits a signal to the second environment, the signal containing an instruction to start operation of the just installed instant interface; and
    the second environment responds to the signal by starting the instant interface.

8. The method according to claim 1, wherein, the interface manager receives a response which includes a confirmation of the successful start of and the address to the instant interface.

9. A system in a software framework for enabling controlled communication between a generic application on the software framework and a service application in a second environment, the system comprising:
    at least one processor configured to execute:
        the generic application adapted to transmit an access request to an interface provision unit, the access request including an identity of the generic application;
        the interface provision unit that is adapted to provide an instant interface to the second environment, the instant interface determined by the access request and dedicated for the generic application; and
        the interface provision unit adapted to return a response to the generic application including an address to the instant interface,
        wherein the instant interface permits controlled communication between the generic application and the service application, thus enabling the new controlled communication without changes of the second environment.

10. The system according to claim 9, wherein:
    an interface manager in the interface provision unit is adapted to receive the request from the generic application; and
    the interface manager is adapted to request an interface creator to create the instant interface with an address.

11. The system according to claim 9, wherein the interface creator is adapted to create the instant interface and reply the address, for the created instant interface, to the interface manager.

12. The system according to claim 9, wherein the interface manager is adapted to transmit an instruction to the second environment, to acquire and install the instant interface identifying the instant interface with the address.

13. The system according to claim 9, wherein the second environment is adapted to acquire and install the instant interface.

14. The system according to claim 9, wherein the second environment is adapted to confirm the completed installation to the interface manager.

15. The system according to claim 9, wherein:
the interface manager is adapted to transmit a signal to the second environment, the signal containing an instruction to start operation of the just installed instant interface; and
the second environment is adapted to start the instant interface.

16. The system according to claim 9, wherein the interface manager is adapted to receive a response which includes a confirmation of the successful start of and the address to the instant interface.

17. A computer program, comprising computer readable code on a non-transitory computer readable medium, which when run by a system in a software framework for enabling controlled communication between a generic application on the software framework and a service application in a second environment, causes the system to perform the following steps:
transmitting an access request by the generic application to an interface provision unit, the access request including an identity of the generic application;
providing an instant interface by the interface provision unit to the second environment, the instant interface determined by the access request and dedicated for the generic application; and
returning a response by the interface provision unit to the generic application including an address to the instant interface,
wherein the instant interface permits controlled communication between the generic application and the service application, thus enabling the new controlled communication without changes of the second environment.

18. The computer program according to claim 17, wherein an interface manager in the interface provision unit receives the access request from the generic application, wherein the interface manager requests an interface creator to create the instant interface with an address.

19. The computer program according to claim 17, wherein the interface creator creates the instant interface and replies the address, for the created instant interface, to the interface manager.

20. The computer program according to claim 17, wherein the interface manager transmits an instruction to the second environment, to acquire and install the instant interface, identifying the instant interface with the address.

21. The computer program according to claim 17, wherein the second environment acquires and installs the instant interface.

22. The computer program according to claim 17, wherein, the second environment confirms the completed installation to the interface manager.

23. The computer program according to claim 17, wherein, the interface manager transmits a signal to the second environment, the signal containing an instruction to start operation of the just installed instant interface and the second environment start the instant interface.

24. The computer program according to claim 17, wherein, the interface manager receives a response which includes a confirmation of the successful start of and the address to the instant interface.

* * * * *

UNITED STATES PATENT AND TRADEMARK OFFICE
CERTIFICATE OF CORRECTION

| | |
|---|---|
| PATENT NO. | : 8,707,330 B2 |
| APPLICATION NO. | : 13/457695 |
| DATED | : April 22, 2014 |
| INVENTOR(S) | : Yasukawa et al. |

It is certified that error appears in the above-identified patent and that said Letters Patent is hereby corrected as shown below:

In the Specification

In Column 6, Line 28, delete "146" and insert -- 140 --, therefor.

Signed and Sealed this
Thirtieth Day of September, 2014

Michelle K. Lee
*Deputy Director of the United States Patent and Trademark Office*